United States Patent [19]
Ambrosio

[11] 4,027,311
[45] May 31, 1977

[54] THERMAL WRITING POWER

[75] Inventor: Biagio F. Ambrosio, Woodland Hills, Calif.

[73] Assignee: Telautograph Corporation, Los Angeles, Calif.

[22] Filed: Oct. 31, 1975

[21] Appl. No.: 627,523

[52] U.S. Cl. .................... 346/76 R; 346/139 C
[51] Int. Cl.² ................ G01D 15/10; G01D 15/16
[58] Field of Search ............... 346/76 R, 139 C; 219/237

[56] References Cited
UNITED STATES PATENTS

| 2,101,913 | 12/1937 | Meyer | 346/76 R |
| 3,134,093 | 5/1964 | Anderson | 346/76 R X |
| 3,438,056 | 4/1969 | Bjork | 346/76 R |
| 3,811,030 | 5/1974 | Veach | 346/76 R X |

FOREIGN PATENTS OR APPLICATIONS

| 242,278 | 3/1926 | United Kingdom | 219/237 |

Primary Examiner—George H. Miller, Jr.
Attorney, Agent, or Firm—Lindenberg, Freilich

[57] ABSTRACT

A thermal nib is provided, which is heated by being directly inserted into an electrical circuit, and which enables writing on thermal paper.

5 Claims, 5 Drawing Figures

THERMAL WRITING POWER

BACKGROUND OF THE INVENTION

This invention relates to a novel thermal writing nib.

Thermal paper, that is paper that darkens in response to the application of heat, has been on the market for some time. Its most popular use is in copying machines where the thermal paper and the copy are placed in contact and a light is shined at the back of the copy. The light is absorbed by the writing on the copy and thus preferentially heats up writing areas to a temperature at which they are able to activate the thermal paper and thereby duplicate thereon the writing on the copy.

The ability to write directly on thermal paper with a pen could have wide beneficial applications in locations where a stand-by writing capability is required and where substantially instant start-up is desired. Such an application, could be for example Telautograph machines, which duplicate what is being written at one location at a distant location. These machines use pens, such as ball point pens. Problems with the ink drying up or the ball point sticking are experienced where stand-by, or non-use has occurred for an interval for time.

Heated styli presently available are not suitable for applications of the type mentioned, since substantially instant start-up is required with minimum power absorption. Presently available styli tips, of types such as are used in soldering irons, are usually heated inductively, or by thermal conduction. For applications of the type mentioned, besides a slower start-up than can be used, these thermally heated tips are wasteful of power.

OBJECTS AND SUMMARY OF THE INVENTION

An object of this invention is to provide a novel and useful heated stylus for writing on thermal paper.

Another object of this invention is to provide a heated stylus which is not wasteful of power and is substantially instantly available for writing.

These an the foregoing objects of the invention may be achieved by forming a strip of resistive metal into a ball point type writing tip by coining the strip of metal to form this point. Leads are then welded to each end of the strip on either side of the formed tip. The strip is then bent around a ceramic form and inserted into a holder. The leads are connected to a source of electrical power.

The novel features of the invention are set forth with particularity in the appended claims. The invention will best be understood from the following description when read in conjuction with the accompanying drawings.

DESCRIPTION OF THE PREFERRED EMBODIMENTS

Figure 1:
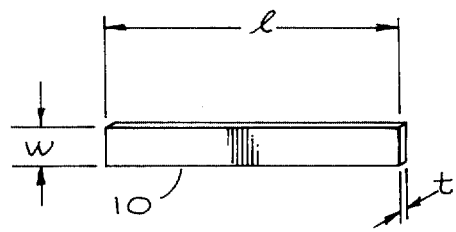
FIG. 1 is a drawing of the resistive metal strip which is used to form a thermal nib in accordance with this invention.

In accordance with this invention, the thermal nib is made out of a resistive metal strip, such as the strip 10, shown in FIG. 1. The metal selected, by way of illustration, has a composition of nickel cobalt and iron. The length of the strip, l, is 0.25 inch. The width of the strip, w, is 0.031 inch. A thickness of the strip, t, is 0.005 inch.

Figure 2:
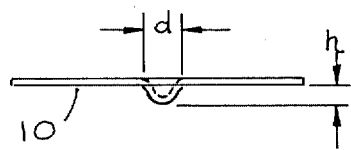
FIG. 2 is a view in elevation of the metal strip after coining.

FIG. 2 is a view in elevation of the strip after coining. The diameter, d, of the coined region is on the order of 0.020 inch. The elevation of the coining, h, is on the order of 0.020 – 0.025 inch.

Figure 3:
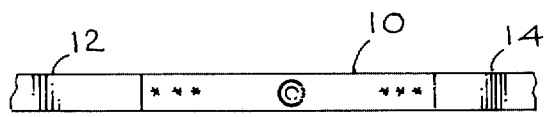
FIG. 3 is a plan view of the metal strip after coining and illustrates where leads are attached.

FIG. 3 is a plan view of the coined strip 10 and shows the next step of the process which is the spot welding of conductive leads respectively 12, 14 on either side of the coined strip.

Figure 4:
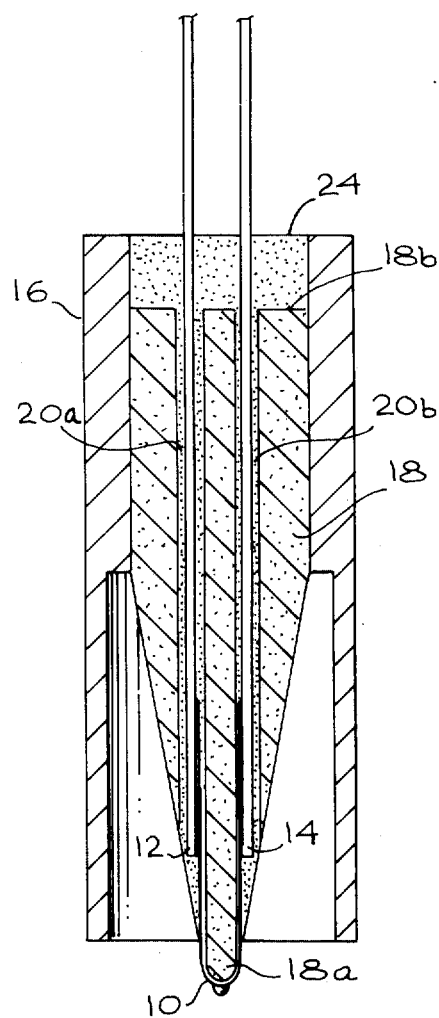
FIG. 4 is a cross-sectional view of the assembled thermal nib in this holder.

FIG. 4 is a cross-sectional view illustrating the assembled thermal nib in its holder. The holder comprises a cylindrical metal sleeve 16 into which there is fitted a ceramic metal core 18. The ceramic metal core has a front end 18a, which, as may be seen in the draings, is ground down to a point, and a back end 18b, which is flat. Two holes respectively 20a, and 20b, are drilled transversely through the ceramic core. The strip 10 is bent around the end 18a of the ceramic core so that its two leads 12 and 14 can be pushed through the holes through the ceramic core and extend through the back end 18b. The leads are pulled to pull the resistive metal strip up tightly and so that the coined portion thereof extends outwardly like the tip of a ball point pen. Thereafter liquid ceramic 24 is poured around the back end of the core 18b to effectively seal the opening there and hold the leads and the metal strip in place.

Figure 5:
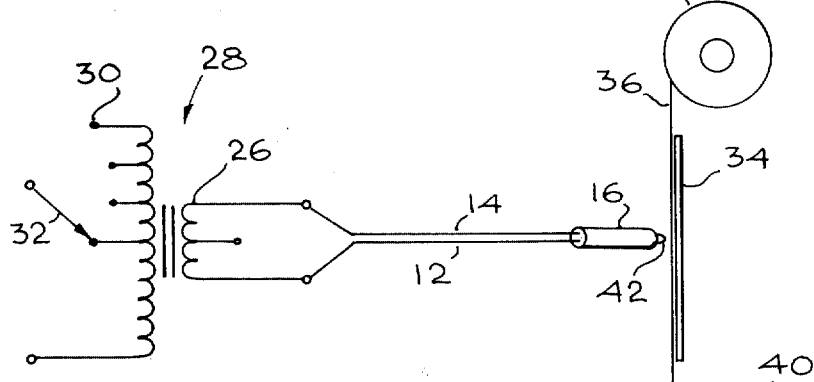
FIG. 5 is a schematic view illustrating the electrical connections which may be employed for heating the thermal nib.

Thereafter, as may be seen in FIG. 5, electrical connections may be made to the leads 12 and 14. Such connection is made to the secondary winding 26, of a stepdown transformer 28, having a tapped primary winding 30. A switch 32 is provided for the primary winding so that the voltage applied to the thermal nib may be selected. It has been found that the higher the voltage and accordingly the higher the temperature, the broader the writing appears on the thermal paper. This voltage selection feature thus enables one to determine how fine or how broad the writing is desired. Also, the variable feature enables one to compensate for line voltages which are too low, which can occur in certain locations.

Another feature of this invention is the provision of a metal platen 34, behind the thermal writing paper 36, which is shown extending from a pay-out reel 38, to a take-up reel 40, through the space between the thermal nib 42 and the metal platen 34. The function of the metal platen is to effectively direct the thermal flow from the nib substantially directly through the thermal paper. Without the metal platen backing up the thermal paper, should the nib get too hot, it would burn a hole through the paper. Otherwise, the thermal flux from the nib spreads out through the paper and causes an effect analogous to bleeding.

It has been found that a writing pressure on the order of 25 grams, approximately, is sufficient to enable the thermal nib to write clearly on the paper. The thermal nib is heated to a temperature on the order of 300° F. All that is required to interrupt writing is to move the thermal nib a distance on the order of 0.1 inch away from the paper. The amount of power consumed by the power nib is 2.0 watts.

There has accordingly been described and shown hereinabove a novel, useful and unique thermal writing nib, which is simple to make and consumes a minimum amount of power while on a stand-by condition.

The embodiments of the invention is which an exclusive property of privilege is claimed are defined as follows:

1. A thermal writing nib comprising
   a resistive metal strip having a portion thereof coined to form a writing point,
   means for backing said writing point for writing on thermal paper, and
   means for connecting the ends of said resistive metal strip directly to a source of electrical power.

2. A thermal nib as recited in claim 1 which is a composition of nickel cobalt and iron.

3. A thermal nib as recited in claim 1 wherein said means for backing comprises a non-conductive cylindrical core having one end substantially in the form of a stylus and having a pair of holes extending transversely through said core from the region adjacent the point of said stylus, said metal strip being bent around the end of said stylus point with its two ends extending into the holes adjacent thereto to be connected to a power source thereby, and
   said coined portion of said resistive strip being backed by the stylus end of said non-conductive core.

4. Apparatus for writing on thermal paper comprising
   a source of electrical power,
   a resistive strip of metal having a central portion thereof coined to form a thermal writing tip,
   means for backing said thermal writing tip for writing,
   means for connecting the ends of said resistive strip to said source of power to afford heating thereby,
   a thermally conductive platen means spaced from said thermal writing point for enabling thermal writing paper to pass therebetween and for backing said thermal writing paper to enable the conduction of thermal flux from said writing point substantially directly through said paper to said thermal platen means.

5. A thermal writing system as recited in claim 4 wherein said source of electrical power comprises a transformer having a multi-tapped primary winding and a secondary winding to which said resistive strip is connected.

* * * * *